Oct. 11, 1960 P. J. BRANCHU 2,956,278
AIRCRAFT-GUIDANCE SYSTEM
Filed May 13, 1958 2 Sheets-Sheet 1

INVENTOR:
PAUL J. BRANCHU
by
AGENT

United States Patent Office 2,956,278
Patented Oct. 11, 1960

2,956,278
AIRCRAFT-GUIDANCE SYSTEM
Paul Joseph Branchu, 119 Blvd. de Grenelle, Paris 15, France
Filed May 13, 1958, Ser. No. 735,001
Claims priority, application France Oct. 22, 1957
15 Claims. (Cl. 343—107)

This invention relates to guidance systems for aircraft, and particularly to a guidance system utilizing sonic or ultrasonic energy emitted from the landing strip and received aboard the craft.

Conventional aircraft-landing systems, whether of the ground control approach or of the instrument landing system types, utilize electromagnetic energy as the information conveying medium between the landing strip and the aircraft. In the G.C.A. system the incoming craft is tracked by radar from the ground and verbal commands are issued to the pilot in accordance with the craft's instantaneous detected position. Such systems are open to two sources of human failing, i.e. both at the ground control tower and on the craft. Moreover, most pilots have a distaste for such a landing procedure in that it requires blind obedience on the pilot's part and implicit faith in the commands received. In many cases verbal messages are too slow a means of communication to effect an emergency landing; and a major drawback of G.C.A. systems is that they are inapplicable, or of difficult applicability, to automatic control of the craft by automatic pilot means.

Systems of the so-called I.L.S. and related types utilize crossed beams of radio energy, such as a localizer and a glide-path beam, emitted from the landing strip and received aboard the craft. Any displacement of the craft from the axis of either beam is manifested as a signal corresponding in polarity or phase to the sense of displacement, and these signals may operate the respective pointers of a cross-pointer indicator or zero-reader. The pilot then simply has to fly the plane so as to maintain the zero reading of the indicator. Such a system is readily applicable to direct control of the craft through conventional auto-pilot means. However, a major drawback of such systems is that they are unreliable at altitudes less than a predetermined value, so that the actual landing must be effected visually and manually. Moreover, the radio beams are apt to be considerably distorted, thereby impairing accuracy of approach even at higher altitudes.

As a result of the above deficiencies of current landing systems, full blind-landing procedure has not been generally adopted in commercial aeronautics and to this day landing on a fog-bound airport is prohibited.

It has already been proposed to utilize acoustic, i.e. sonic and ultrasonic, energy as the means of conveying information for landing an aircraft. Owing to the relatively slow propagation velocity of acoustic waves the accurate measurement of short distances is possible, e.g. by procedure similar to marine depth sounders and sonic altimeters. However, insuperable difficulties have been encountered heretofore when it was attempted to provide an aircraft-landing system based on ultrasonic-wave transmission. The chief source of trouble is the Doppler effect whereby the frequencies of the waves received on the craft is made dependent on the speed of approach; moreover, uncontrollable reflection on the ground and the large volume of acoustic energy emitted by the airplane's engines in the sonic and ultrasonic ranges of the acoustic spectrum introduce further causes of error which are especially difficult to eliminate as by frequency discrimination between the useful and noise signals, on account of the unstable signal frequency caused by the Doppler effect. Furthermore, the useful range of acoustic signals when transmitted in the conventional manner is extremely limited.

It is an object of this invention to provide new and improved landing systems which will be free of the above drawbacks. Other objects include the provision of craft-guidance systems which will permit safe landing entirely by instrument or autopilot, and will be readily adaptable for use with conventional autopilot systems. Further objects lie in the provision of an ultrasonic guidance system in which the objectionable consequences of the Doppler shift will be entirely or substantially eliminated; which will possess a greatly increased useful range; and which will be usable in conjunction with or as a complement to conventional radio-beam guidance systems to effect safely the ultimate and most delicate stages of a landing procedure after the craft has been radio-guided into proximity with the landing strip. Another object is to provide an ultrasonic system which will be capable of reliably and accurately imparting to the pilot part or all of the pertinent flight data including lateral displacement of the craft from the landing-strip center line, longitudinal position along the strip, altitude, and the angular displacements of the craft with respect to each of the three craft axes, i.e. heading, bank and pitch. Further objects lie in the provision of novel linear ultrasonic generators.

The various objects of the invention are attained, broadly speaking, by the use of acoustic waves of cylindrical shape emitted from the ground and received and utilized aboard the craft in a manner to be specified.

The features and advantages of the invention will be made clear from the ensuing description in which some selected embodiments thereof, given by way of illustration but not of limitation, will be fully described. Reference is made to the accompanying diagrammatic drawings, wherein:

Figs. 2 to 5 and Fig. 10 show exemplary electric circuits usable in the invention;

Figure 1:
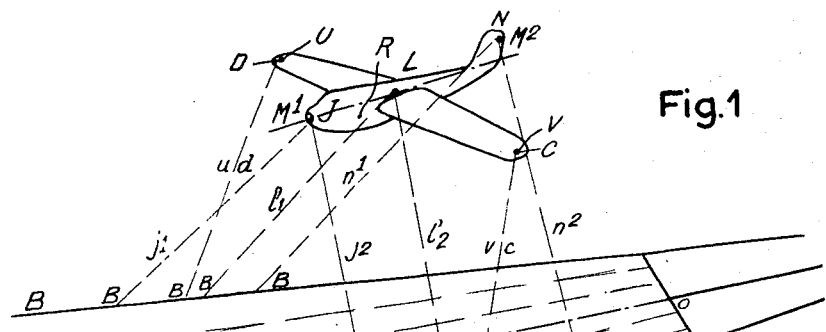
Fig. 1 is a perspective view illustrating the principles of the invention and showing a landing strip and an aircraft about to land thereon.

Referring to Fig. 1, there is shown a landing strip G alongside and on opposite sides of which there are provided a pair of linear acoustic generators or transducers A and B, which are parallel to and equidistant from the center line of the strip. The linear transducers A and B may assume any of a wide variety of forms some of which will be described in detail hereinafter. In one form of the invention, each linear transducer may comprise a linear array of a multiplicity of closely spaced conventional transducers, together with means for energizing all of them in strictly synchronous and co-phasal relationship. Preferably, however, the transducers are of continuous character as will be later described. Any of the conventional methods of generating acoustic wave energy may be used in connection with the transducers; thus, the transducers may be electrostatic, electromagnetic, piezo-electrical or magnetostrictive in character, or they may utilize jets of compressed air discharged through ports or slots vibrated by any suitable means.

According to a basic characteristic of the invention, the linear transducers A and B generate waves of cylindrical form which expand about the respective transducers as the cylinder axes. Preferably the transducers are operated so as to generate wave pulses of short duration as compared to the repetition cycle thereof. The carrier frequencies of the signals generated by the two linear transducers are slightly different for discrimination thereof by the receivers on board the aircraft as will presently appear. The signals in both linear transducers are synchronously emitted.

The wave energy emitted by the linear transducers is received on board the aircraft by suitable receiver means, such as microphones. The receivers may be positioned at any of various points aboard the craft depending on the particular manner in which the novel system of the invention is to be used.

Reception of the two ultrasonic frequencies from the respective families of cylindrical waves generated by linear transducers and conversion thereof into suitable electric volt-signals is capable of imparting a large variety of useful flight data as will be made clear from the ensuing descriptions of the principal ways in which the invention can be utilized.

As will be more specifically described, the determination of a majority of such data is broadly based on time-lapse measurements, as between acoustic pulses transmitted from a given linear transducer and received at two spaced points of the craft, or conversely between pulses transmitted from each of a pair of spaced linear transducers and received at a given point of the craft. Such differential time measurements, as will presently appear with greater clearness, are capable of conveying a wealth of valuable flight information for guiding the craft, and it will be realized that such measurements are made possible only because the acoustic wave energy involved has a comparatively slow propagation velocity, and that they could not be performed with the use of radio waves since the corresponding time lapses would be immeasurably short. Further, accurate measurements are possible because of the inherent form of the acoustic waves used according to the invention, that is, cylindrical waves generally parallel to the flight path of the landing aircraft. This not only provides a constant uniform source of wave energy to which a desired condition of the airplane, such as heading and altitude, can be continuously referred, but further it almost completely eliminates the Doppler effect which clouded the measurements in previously attempted guidance systems relying on spherical acoustic waves as emitted by conventional transducers. Another important advantage of cylindrical over spherical waves is their greatly increased useful range. For, whereas the dispersion of spherical waves increases as the square of the radial distance, that of cylindrical waves increases as the first power of the radial distance; this greatly reduces the power requirements for a given range, or conversely extends the effective range of the system.

Section 1.—Determination of the displacement of a selected point of the craft from the vertical midplane of the landing strip A microphone, or a pair of closely-spaced microphones, generally designated L, is mounted at a selected point of the longitudinal midplane of the airplane, and is connected to a suitable electronic converter apparatus for measuring the time lapse between the reception of a pulse from the transducer A and the reception of the corresponding pulse from transducer B. The resulting electric signal is therefore a measure of the difference $(l_1-l_2)$ between the distances BL and AL.

Conveniently, the converter apparatus (an example of which will be described later) is such as to deliver a direct-current signal of value $i_0$ proportional to the measured time lapse. The signal current is of one or the other polarity depending on the sense of the displacement of the point L from the midplane of the landing strip. The signal may be fed to the horizontally displaceable pointer of a cross-pointer or similar meter. With the pointer on the zero mark the craft is positioned on the vertical midplane of the landing strip, while pointer displacement to left or right indicates corresponding deviation of the craft from said midplane.

Section 2.—Determining craft heading

Assuming a first microphone or pair of microphones is positioned at J near the nose of the craft and another microphone or pair thereof is positioned at N near the tail, then the respective differential signals $i_1$ and $i_2$ derived as described in Section 1 at each receiver point J and N will be respectively proportional to the values $(j_1-j_2)$ and $(n_1-n_2)$, wherein the symbols have the meanings clearly indicated in the drawing. Thus the difference between the two signals $i_1$ and $i_2$, as derived by any conventional means such as a differential galvanometer, will yield a signal $I_1=i_1-i_2$ which is a function of the angle between the fore-aft axis of the craft and the vertical midplane of the landing strip. This signal may be applied to a heading indicator, or/and to the rudder and aileron channels of a conventional autopilot, in a manner well understood by those familiar with the automatic-guidance art.

Section 3.—Determining pitch angle

A somewhat similar procedure will yield an indication of the angle between the craft fore-aft axis and the horizontal plane, i.e. the pitch angle of the craft. The arithmetical sum of the two distances $j_1$ and $j_2$ from the nose of the craft to each linear transducer is a function of the elevation of the nose of the craft above the ground. Hence nose elevation can be expressed as $f(j_1+j_2)$. Similarly tail elevation can be expressed as $f(n_1+n_2)$ wherein the two functions indicated as $f$ are obviously identical. The tangent of the pitch angle, i.e. substantially the pitch angle itself, is proportional to the difference between nose and tail elevations, hence $$\alpha = f(j_1+j_2) - f(n_1+n_2)$$

where $\alpha$ is pitch angle. Since the function $f$ is the same for both terms in brackets as just mentioned, this can be written:

$$\alpha = f(j_1-n_1) + (j_2-n_2)$$

In a manner similar to that described in the foregoing sections, two D.-C. signals $i_3$ and $i_4$ are derived, such that $i_3=j_1-n_1$ and $i_4=j_2-n_2$, and the two signals are then arithmetically added to provide a final signal $$I_2 = i_3 + i_4$$

which is a measure of the craft's pitch attitude.

Section 4.—Determining bank angle

For this purpose microphone receivers may be positioned at the wingtips, at U and V respectively, and are respectively connected to receivers tuned to the frequencies of the respective linear transducers. The time lapse between the reception of corresponding ultrasonic pulses at both microphones is measured and converted into a signal $I_3$. This is a measure of the difference between the distances $u$ and $v$ (which have the meanings indicated on the figure), so that $$I_3 = u - v$$

is a function of the craft's bank angle. It is noted that this signal is also a function of the craft's lateral displacement from the landing-strip mid-plane, a quantity which is obtained by the method described in Section 1 above. The manner in which the signal $I_3$ can be utilized will be described later.

Section 5.—Altitude determination

In the foregoing methods only the difference relationships between the reception times of the ultrasonic pulses need to be determined. For altitude determination it is evident that some additional means must be provided for indicating the time at which a received pulse was actually emitted by the corresponding linear transducer.

For this purpose a suitable low-power radio transmitter is provided at any convenient point on the ground, and a radio receiver R is provided on the aircraft. The transmitter is operated to emit radio pulses synchronized with the sonic pulses from the linear transmitters. Because of the near-instantaneous propagation of radio waves the time at which each radio pulse is received in radio receiver R indicates the time at which a corresponding sonic pulse was transmitted by a linear transducer A or B. Hence a means is had for ascertaining the absolute time interval taken by the sonic pulse to cover the distance from the linear transducer to the craft. Preferably, two transversely displaced microphones C and D are used, e.g. positioned at the wingtips, and the distances therefrom to the corresponding transducers A and B are respectively called $c$ and $d$. Electronic means are provided for producing a signal proportional to the sum of the time lapse between the reception of a radio pulse and the corresponding acoustic pulse at microphone C, plus the time lapse between the reception of the same radio pulse and the corresponding acoustic pulse at microphone D. This sum signal $I_4$ is a function of the total distance $(u+v)$ and hence a substantially accurate measure of craft altitude.

It will be understood that two or more of the various microphones mentioned in the preceding Section 1 to 5 may be combined into one. Thus the microphones J and L may be replaced by a common microphone, and the same is true of the pairs U and D, and V and C. Suitable means must then be provided for discriminating among the pulses received; and it is found particularly convenient in such cases to use microphones of the aperiodical type.

Section 6.—Use of an axial linear transducer

The description so far has referred to the use of a pair of linear ultrasonic generators A and B extending along the sides of the landing strip. The invention however may in some cases contemplate the utilization of a single linear transducer, instead of or in addition to the pair of spaced linear transducers. Thus, an additional axial transducer may be valuable in increasing the accuracy of measurements at very low craft elevations. It will be noted from Fig. 1 that when the craft is flying very low the lines such as $d$, $c$, $n_1$, $n_2$ etc., are sloping at acute angles to the horizontal plane. While this situation, far from detracting from the accuracy of the lateral displacement and heading measurements described in Sections 1 and 2, actually increases the accuracy thereof, it does tend to reduce the reliability of the pitch attitude and altitude measurements described in other sections. The invention contemplates two chief ways of overcoming this difficulty.

Figure 11:
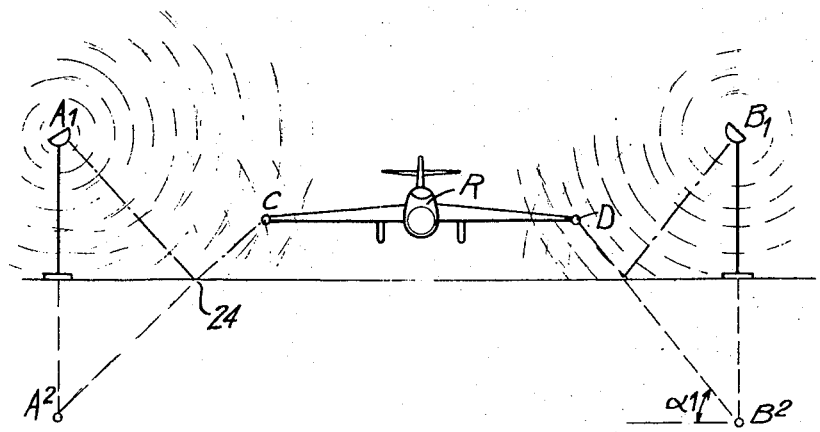
Fig. 11 is a perspective view illustrating a modified system.

One way is to mount the pair of linear transducers A and B as overhead lines in the manner shown at $A_1$ and $B_1$ in Fig. 11. The transducers are mounted in inverted condition so as to direct the ultrasonic waves generated by them in a downward direction for reflection from a suitable reflective surface such as area 24 extending beneath each transducer line. The general effect of this set-up is equivalent to providing a pair of imaginary linear transducers $A_2$ and $B_2$ positioned underground as shown. It will be noted that the effective angles at $\alpha$ 1 are increased over the corresponding values obtaining with the set-up shown in Fig. 1, and that the said effective angles retain substantial non-zero values even when the aircraft is at zero altitude. Thus the source of inaccurate measurement mentioned above may be removed.

However, according to a preferred embodiment of the invention, a similar result may be achieved while retaining the ground transducers of Fig. 1, by the provision of an additional axial transducer as indicated above. The axial transducer is shown at O in Fig. 1 and extends, in alignment with the center line of the landing strip, beyond one end or preferably each end of the strip. Measurement of the vertical distance from the craft to said axial transducer, by the general method described in Section 5 above, yields a signal $I_3$ proportional to craft altitude, which signal is free of the source of error mentioned above in the very low altitude range.

Section 7.—Determining the vertical component of craft velocity (rate of dive)

As mentioned earlier herein, the cylindrical waves utilized according to the invention inherently eliminate to a major degree the objectionable Doppler effect encountered with any systems utilizing spherical waves of conventional character. More specifically, that portion of the Doppler shift which is due to the horizontal component of the flight velocity of the airplane parallel to the axis of the linear transducer or transducers used is wholly eliminated. However, a small residual Doppler effect is present by reason of the vertical component of the craft's velocity as the craft approaches the ground. While this vertical component is so low as compared to sound velocity that the Doppler shift due to it only has a negligible effect on the measurements described hereinabove, still the resulting frequency shift is accurately measurable and can, according to another feature of the invention, serve to provide a reliable measure of the airplane's rate of descent.

For this purpose a suitable frequency meter is used to indicate the rate of shift in frequency of the ultrasonic pulses as detected on the craft, with respect to a stable frequency standard as provided by a crystal oscillator or the like. The frequency-shift measurement may be readily effected by generating a differential beat frequency from the received frequency and the standard, and measuring this beat frequency. A suitable frequency meter for this purpose may comprise a clipper circuit for converting the beat signals into square pulses, and a unidirectional differentiator network for passing only the positive differentiated pulses produced. These pulses can be passed through a double integrating circuit to develop a signal $I_6$ proportional to the desired frequency shift. This signal may be applied to a suitable indicator instrument calibrated in rate-of-dive units. The signal can further, or instead, be used for automatic control of the craft in a manner well understood in the automatic-pilot art.

In the rate-of-descent measurement just described, the ultrasonic signals may be derived either from the single axial linear transducer mentioned previously, or from the pair of spaced linear transducers.

There has been described above the procedure for developing on the craft a number of electric voltage signals measuring a set of respective flight parameters including lateral craft displacement, heading angle (signal $I_1$), pitch attitude ($I_2$), bank attitude ($I_3$), altitude ($I_4$), and rate-of-descent ($I_6$). As already mentioned the signals may be used for visual indication and/or automatic control. Generally speaking the procedure used may be the same as with conventional I.L.S. system. There is developed a "localizer" signal for guiding the craft towards or maintaining it on the vertical midplane of the landing strip, and a "glide-path" signal for guiding the craft in descent.

Section 8.—Localizer signal

For stable flight guidance the localizer signal should preferably respond to the lateral displacement ($x$) of the craft from the localizer plane, the first time derivative ($x'$) thereof and the second time derivative ($x''$) thereof. As will appear from the previous description, the signal $I_3$ is a function of both the lateral displacement $x$ and the bank angle, itself dependent on $x''$. Hence this signal may be used for introducing the factors $x$ and $x''$. Preferably however a modified signal $I_7$ is developed which additionally includes a component proportional to rudder deflection, in order to make allowance for flat turns of the craft due to rudder without benefit of aileron deflection, as are performed when the craft is flying extremely close to the ground.

A signal component proportional to $dx/dt$ may conveniently be represented by the aforementioned signal $I_1$ which represents the heading angle of the craft relatively to the localizer plane. In addition, a component $I_8$ may be applied measuring side wind.

The resulting localizer signal then solves the equation $$k_1 I_1 + k_3 I_7 + k_8 I_8 = 0$$

wherein the $k$'s are proportionality factors for adjusting the relative strengths of the signals components.

This localizer signal may be applied to the vertical, horizontally displaceable pointer of an I.L.S. zero-reader or cross-pointer indicator, and it may be applied to the rudder and aileron channels of an automatic pilot.

Section 9.—Glide-path signal

The glide-path signal may desirably be derived from the pitch signal $I_2$ and/or the rate-of-descent signal $I_6$. For bringing down the craft at constant pitch attitude, the pitch signal $I_2$ may be balanced against a constant-intensity signal $I_9$ so that $I_2 = I_9$. For bringing down the craft at constant rate of descent, the rate signal $I_6$ may simply be substituted for $I_2$ in the above equation. Combinations of both pitch and rate-of-descent signals, as well as combinations of either or both with the altitude signal $I_5$, may likewise be used.

The glide-path signal may be applied to the horizontal, vertically displaceable, pointer of the cross-pointer instrument. In manual flight the final round-off of the craft just before touching ground can be effected by suitable action on the controls, and the human pilot may rely on his sighting of the landing beacons. In automatic control, however, the system of the invention provides an extremely desirable way of effecting the final round-off through automatic application of suitable ones of the signals described above, as will presently be shown.

Very desirably the acoustic landing system of this invention is combined with a conventional radio-beam guidance system for bringing in the craft to a predetermined elevation, of say 200 feet, within the ultrasonic field of the linear transducers of the invention. At this time an accurate altitude indication may be derived from the ultrasonic system by the method described in Section 6, and, in case of a slight or moderate discrepancy between the two altitude indications, the glide-path of the craft may be corrected into accord with the more reliable ultrasonic indication. However, should a discrepancy be noted in excess of a predetermined value, indicating that one at least of the altitude-measuring means is defective, then a safety device including a differential relay may be energized to provide a visual alarm signal and cause the craft automatically to climb back to a safe elevation.

After the craft has thus been brought down to a predetermined low elevation above the landing ground, automatic means are preferably provided to act on the controls to round off the glide path so that the craft will land substantially tangentially or asymptotically to the field. For this purpose the glide-path signal should be converted to such form as to solve the differential equation $$h + K \frac{dh}{dt} = 0$$

where $h$ is craft elevation and $K$ a constant. The resulting flight path of the curve will then follow the inverse exponential curve $$h = K e^{-t}$$

having the desired asymptotic relationship to the landing surface. In the above differential equation, the variable $h$ is represented by the aforementioned altitude signal $I_4$ and the term $$\frac{dh}{dt}$$

by the Doppler frequency shift signal $I_6$.

The automatic landing procedure would then be performed as follows. As the craft initially enters the range of the ultrasonic guidance system of the invention the elevator and throttle channels of the craft's automatic pilot are operated in accordance with the glide-path signal described above, to fly the craft along a linear glide path such that the pitch angle and/or the rate of dive of the craft is held constant, as previously described. Then on reaching a predetermined low elevation at which automatic round-off is desired, the glide-path signal applied to said autopilot channels is modified in accordance with the above round-off differential equation, so that the glide path followed by the craft merges smoothly with the horizontal plane. For effecting the switch-over from one type of signal to the other, one convenient way is to use the characteristic of a suitable amplifier tube, wherein the horizontal saturated portion of the characteristic curve will serve to provide the constant-current signal corresponding to the linear initial portion of the glide path, while the bend in the curve will initiate round-off operation. The control grid of such tube may be energized with the altitude signal $I_4$ derived as previously described.

It will readily be understood that effective and reliable use of the ultrasonic signals received on the craft according to the invention implies the requirement that some means be provided for substantially eliminating the noise generated by the craft engines and other sources of sonic disturbance on the craft. A conventional resonant, tuned-circuit receiver would be useless in this connection since the great volume of noise generated by the craft would act to shock-excite the oscillatory circuits, causing them to generate damped wave trains having a pseudo-frequency which is the same as the resonant frequency of said circuits, so that the resulting noise would be inseparable from the useful signal. According to a feature of the invention, therefore, the receiver system provided on board the craft is preferably designed as illustrated in the block diagram of Fig. 2.

Figure 2:
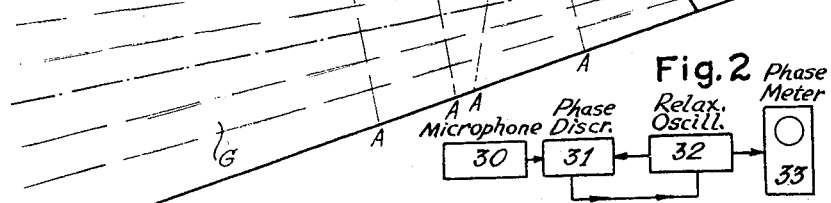

Referring to Fig. 2, block 30 designates a microphone of suitable aperiodical type, e.g. an electrostatic one. The output signal from the microphone is amplified and its phase is compared by means of a phase-discriminator circuit 31 with the phase of the output from a suitable relaxation oscillator 32, e.g. of the multivibrator, gas-discharge, or blocking oscillator type, adjusted to put out pulses at a repetition frequency substantially equal to that of the received ultrasonic pulses. The phase discriminator 31 delivers a resulting D.-C. error voltage which is fed back negatively to the relaxation oscillator 32 as a variable grid bias to control the frequency and phase of the oscillator output. As a result of this negative feedback any displacement between the phase condition of the oscillator output and that of the received signals tends to be reduced to zero. The phase discriminator is provided with a long time constant so that short sharp noise or disturbance signals will be ineffective on the error voltage and will not produce a change in the phase of the oscillator pulse output. This is the so-called flywheel effect well-known in the fields of radar and television.

The output pulses from the local generator 32 serve as the output signals for the time (or distance) measurement required in the method of the invention. It will be noted that in this way the highly disturbed, impure incoming pulses are replaced by local pulses in phase with the incoming pulses but completely free of parasitic noise disturbance. Thus, in connection with the method of altitude measurement described in Section 5, the output pulses from the oscillation generator may be applied to one input of a phase meter 33 to the other input of which are applied the pulses received from the synchronous radio transmitter as described in that section. The phase meter 33 may deliver an integrated output in the form of a D.-C. voltage signal proportional to the time interval between the pulses. One suitable form of phase meter usable for measuring the time interval between pulses according to the invention is provided by a conventional flip-flop or bistable multivibrator circuit (Eccles-Jordan circuit).

Figure 3:
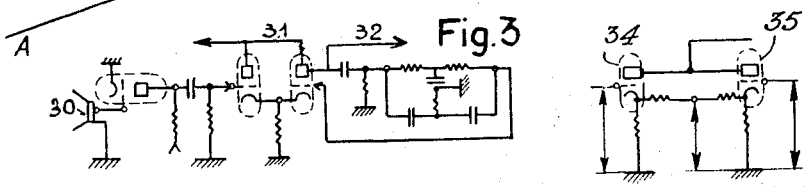

Fig. 3 illustrates a partial diagram of the system shown in block form in Fig. 2 and described above, including the microphone 30, a pre-amplifier triode, an R-C filter network, a twin-triode phase discriminator 31 connected to oscillator 32 of Fig. 2, and a selective negative-feedback circuit therefor including a conventional double-T bridge network.

While various conventional circuits may be used for deriving the sum and difference signals as required in the various aspects or steps of the invention described in earlier sections, Fig. 4 shows one convenient form of such a circuit using a pair of triodes 34 and 35 having interconnected plates and interconnected cathodes. The component signals are applied to the respective grids and the sum signal is derived across the common cathode junction and ground. A difference signal where required may be derived from the same circuit, across the respective cathodes thereof.

Figure 5:
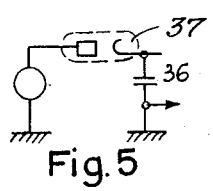

Fig. 5 illustrates a simple circuit for storing a voltage signal, as may be required e.g. in connection with the landing round-off signal described in the proceding section. A condenser 36 is charged from the signal source through a diode 37 so as to assume gradually a D.-C. voltage charge strictly proportional to the crest voltage of the signal source. The storage time is adjusted by adjusting the time constant of the circuit.

*Section 10.—Construction of the linear transducers*

A few exemplary embodiments will now be described for the linear ultrasonic generators or transducers, such as A, B and O (Fig. 1), which constitute basic components of the system according to the invention.

Figures 6, 7:
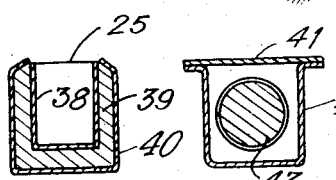
Figs. 6 to 9 are cross-sectional views of illustrative embodiments of linear ultrasonic generators or transducers according to the invention.

One construction for such linear transducers, electrostatic in character, involves the use of a lightweight, low-inertia diaphragm of insulating material and means energized with A.-C. voltage adapted to create an alternating electrostatic field for vibrating the diaphragm. Vibration frequencies of up to about 30,000 cps. are thus obtainable. Referring to Fig. 6, which is a cross-sectional view of an electrostatic linear ultrasonic generator based on this principle, there is provided an elongated metallic channel member 38 which is supported within another and larger metallic channel member 40 spaced therefrom through suitable insulating spacer material 39. Stretched across the tops of the side flanges of the inner channel member 38 is a strip 25 of a suitable lightweight insulating sheet material, such as "Triafol B" sold by Farbenfabriken Bayer AG., having a metal-coated upper surface electrically connected with the grounded outer or shielding member 40. Suitable A.-C. energizing means, not shown, are provided for applying to the inner channel member 38 an A.-C. voltage of the desired frequency. Preferably a suitable D.-C. bias voltage is simultaneously applied to provide stable vibration.

The system thus described may be simply supported on the ground through suitable spaced supporting or securing means, whereupon the application of an alternating excitation voltage to the inner member 38 will vibrate the diaphragm strip 25 throughout the linear transducer to generate the desired semi-cylindrical ultrasonic waves required in practicing this invention. Alternatively, however, improved protection of the device against weather is obtained if the device thus described is mounted in inverted condition, i.e. with the diaphragm strip 25 facing downwards, and supported say a foot or two above the ground on suitably spaced supports. Vertically below the device and extending parallel to it is a reflective strip, serving to direct the ultrasonic waves upwardly, in a manner generally similar to what was described in connection with Fig. 11.

Fig. 7 illustrates another form of linear transducer according to the invention, magnetostrictive in character. This form of device generally comprises an elongated channel member 42 of magnetic material, providing a U-shaped magnetic circuit and having a magnetostrictive bimetal strip 41 secured (e.g. welded) across the outturned ends of the side flanges thereof. The bimetal element 41 is of the generally known type in which two different alloys suitably selected to possess predetermined differential magnetostrictive characteristics are rolled into a common strip. Such a strip when positioned in a magnetic field will flex in one sense or the other depending on the direction of the field. Suitably supported centrally of the magnetic channel member 42 is a central conductor 43 to which an alternating energizing voltage of the desired frequency is applied, preferably simultaneously with a D.-C. voltage providing the magnetic bias. The magnetostrictive strip 41 is thus vibrated at a natural vibrating frequency depending on the dimensions and the elasticity modulus of the strip. The energizing voltage used should be resonant with this natural frequency. Associated with the inner conductor 43 is a return conductor, not shown, preferably extending adjacent to and exteriorly of the channel member 42. The resulting circuit possesses a relatively high impedance due to its length and to the high frequencies involved. Hence transformers may be provided for supplying the energizing voltage to spaced points of the transducer.

An advantage of the magnetostrictive linear transducer shown in Fig. 7 over that of Fig. 6 is its sealed, highly rugged character. The outer protective sheath assembly comprising magnetic channel member 42 and magnetostrictive bimetal strip 41 may be formed in a plurality of interconnected sections; the inner conductor 43 is preferably formed as an insulated cable conductor. The magnetic member 42 may be formed of a thin-gauge sheet of a suitable magnetic steel, and while it may be advisable in some cases to provide the member in a plurality of stacked laminations, this will probably not be generally necessary in view of the small wall thickness used. The device can be compared to a magnetic circuit in which the laminations extend in end-to-end relationship along the length of the device, rather than in stacked relationship as in conventional magnetic circuits.

As another alternative, the linear transducer of the invention may be provided in the form of a simple tube of magnetostrictive metal material such as nickel sheet, coiled in a plurality of turns about an insulated axial conductor. The tube may be formed in a plurality of sections.

Figure 8:
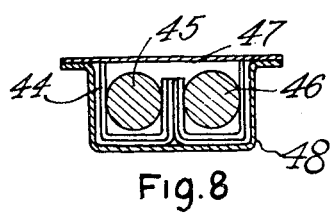

Fig. 8 illustrates another embodiment of linear transducer according to the invention, which is of electromagnetic character. Supported within an outer metallic channel-shaped shielding member is a dual magnetic circuit in the form of two adjacent U-sections 44. Extending between the branches of each U-section is an energizing conductor 45 and 46. Welded to the outturned lips of the side flanges of the channel member 43 is a flexible metallic armature strip 47 adapted to be vibrated by magnetic attraction developed primarily by the central upstanding flanges of the U-sections.

Figure 9:
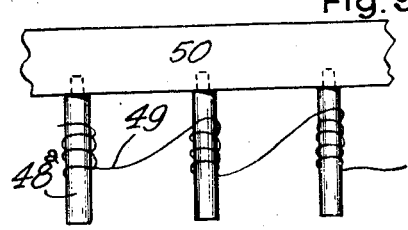

Fig. 9 illustrates another type of magnetostrictive linear transducer using a set of magnetostrictive cores 48ª, e.g. made of stacks of laminated nickel in the form of cylindrical elements. Wound around each core is an energizing winding 49 connected to the source of alternating voltage. The cores have reduced ends inserted into and welded in sockets formed in an elongated metallic member or rail 50. When the windings 49 are energized all the cores 48ª vibrate bodily together, thereby imparting a bodily vibration to the rail 50. The transverse dimensions of the rail 50 are predetermined in view of the elasticity characteristics thereof so as to have a natural resonant frequency corresponding to the desired vibration fequency.

An ultrasonic linear transducer of any of the types described above is preferably supplied from a pulsed generator having a pulse-repetition frequency of the order of, say, 2 cycles per second. Ultrasonic wave pulses are emitted of, say, 20 kilocycles and in an adjustable time ratio, such as pulses of 2 milliseconds duration each comprising 40 cycles of the ultrasonic carrier frequency.

Figure 10:
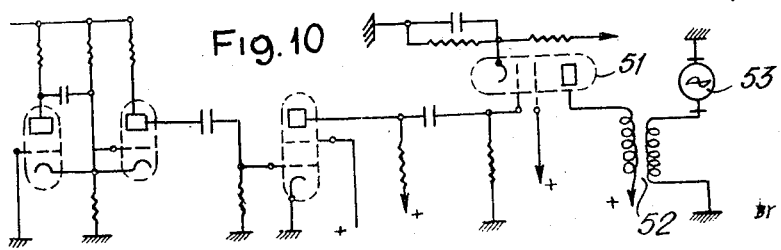

Fig. 10 illustrates an exemplary circuit whereby such pulses may be applied to a linear transducer of the invention schematically indicated at 53. As shown, a cathode multivibrator is used to generate negative pulses at the desired repetition frequency. The output from the multivibrator is applied to a coupling amplifier and reverser stage which yields pulses of amplified positive polarity. These positive pulses are then applied to the control grid of a power amplifier tube 51 mounted as a class-B amplifier by application of a suitable cut-off bias to its screen grid. Thus application of each positive pulse to the control grid of tube 51 renders the tube conductive and discharges a high saturating current through the plate circuit thereof. Connected in this circuit is the primary of a transformer 52 the secondary of which is connected across the linear transducer 53 providing the load. When the high plate current from tube 51 is applied to the primary of transformer 52 a high amount of energy as expressed by $\frac{1}{2} LI^2$ is present in said winding. At the end of the pulse the plate current is cut off sharply and the primary energy is converted into potential energy according to the equation $\frac{1}{2} LI^2 = \frac{1}{2} CV^2$ where C is the capacitance in parallel with the transformer primary, including the distributed capacitance, stray capacitance, and capacitance of the transformer secondary as viewed from the primary. As a result of the energy conversion a series of damped wave trains are produced at a frequency equal to the frequency of the resonant load, i.e. the linear transducer 53. The output transformer 52 is preferably so dimensioned that the oscillatory circuit formed by the transformer primary with its distributed capacitance has a natural frequency identical with the natural frequency of the linear transducer.

In addition to providing an incoming aircraft with the various flight data described in detail hereinabove, the system of the invention is further able in a very simple manner to indicate the longitudinal position of the craft relative to the landing strip, should such indication be desired. Thus, it will be noted from Fig. 12 that toward each end of the linear transducers according to the invention the ultrasonic waves 29 are distorted from their purely cylindrical form and are not parallel to the strip. Hence as the incoming craft first enters the "acoustic tunnel" or beam of the invention, the Doppler effect has a high initial value due to the flight-velocity component normal to the distorted ultrasonic waves in such end areas, and the frequency-meter pointer deflects sharply as a result of Doppler shift. This provides useful information to the pilot as to the instant at which he may have to switch from the particular guidance system he was using to the acoustic guidance system of the invention.

Figure 12:
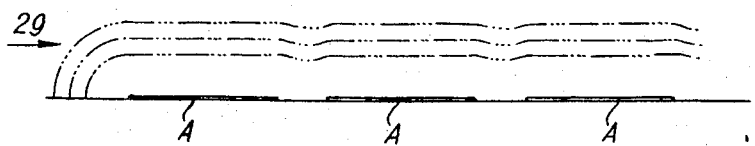
Fig. 12 illustrates a pattern of acoustic waves adapted to be generated by the ultrasonic transducers.

Further, one or more spaced gaps may be provided at selected points along the linear transducers, as likewise seen in Fig. 12, so that the cylindrical wave surfaces will at such points display corresponding annular distortions or restrictions and the frequency meter will deflect as the craft flies past each such distorted section. The desired indications are thus made available.

Thus, the invention has provided a novel aircraft-guidance system utilizing ultrasonic waves of cylindrical configuration generated by one or more linear ultrasonic generators extending along the landing field. By receiving the generated wave pulses at one or more suitable points of the craft and measuring the time intervals between reception of corresponding pulses, flight parameters including lateral craft displacement, heading, pitch and bank angles, and longitudinal position can be determined and corresponding electric signals produced for purposes of indication and/or automatic craft control. Altitude signals can be derived by measuring the reception-time interval between such an ultrasonic pulse and a corresponding radio pulse emitted by a synchronous radio transmitter. Rate-of-change-of-altitude signals can be developed by measuring the Doppler frequency shift due to the craft's vertical velocity component; and signals indicative of the craft's instantaneous longitudinal position can be produced.

What I claim is:

1. In a system for the guidance of an aircraft, in combination, a parallel-spaced pair of elongated ultrasonic generators extending parallel to the ground and each adapted to generate cylindrical waves of ultrasonic energy, means exciting said generators with synchronous pulses of different carrier frequencies, ultrasonic receiver means on said aircraft adapted to receive both said carrier frequencies, and electrical means on said aircraft responsive to the time lapse between reception of synchronously generated pulses from the respective generators by said receiver means for developing a reversible electric signal corresponding in sense and magnitude to said time lapse.

2. In a system for assisting the landing of an aircraft on a landing strip, in combination, a pair of parallel-spaced linear ultrasonic generators of cylindrical waves extending along opposite sides of said strip, electric means for exciting said generators in synchronous pulses of different carrier frequencies, ultrasonic receiver means on said aircraft adapted to receive ultrasonic energy at both said carrier frequencies, and electric circuit means connected to said receiver means and responsive to the time lapse between reception of synchronously generated pulses from the respective linear generators for developing a reversible electric signal corresponding to said lapse.

3. In a system for the guidance of an aircraft, in combination, a parallel-spaced pair of elongated linear ultrasonic generators of cylindrical waves extending parallel to the ground, means exciting said generators for emitting synchronous signals of ultrasonic energy, ultrasonic receiver means on said aircraft for receiving synchronously emitted pair of signals from the respective generators, and electronic means connected to said receiver means and responsive to the time lapse between reception of both signals of said pair for developing a reversible electric signal corresponding in sense and magnitude to the sense and amount of displacement of the aircraft from the vertical longitudinal midplane between said linear generators.

4. In a system for the guidance of an aircraft, in combination, a parallel-spaced pair of elongated linear ultrasonic generators of cylindrical waves extending parallel to the ground, means energizing said generators for emitting synchronous signals of ultrasonic energy, ultrasonic receivers on said aircraft positioned at longitudinally spaced points thereof each adapted to receive synchronously emitted pairs of signals from the respective generators, electric means connected to said receivers and responsive to the time lapse between reception by the respective receivers of a related signal of said pair to develop a pair of reversible electric signals respectively corresponding to said time lapses, and means for adding said electric signals to provide a resulting reversible signal corresponding in sense and magnitude to the pitch angle of the aircraft.

5. In a system for the guidance of an aircraft, in combination, an elongated linear ultrasonic generator of cylindrical waves extending along the ground, means energizing said generator for emitting signals of ultrasonic energy, ultrasonic receivers on said aircraft positioned at longitudinally spaced points thereof for receiving said signals, and electric means connected to said receivers and responsive to the time lapse between reception of a common signal by the respective receivers to develop a reversible electric signal corresponding in sense and magnitude to said time lapse, whereby said electric signal is a measure of the pitch attitude of the aircraft.

6. In a system for the guidance of an aircraft, in combination, a parallel-spaced pair of elongated linear ultrasonic generators of cylindrical waves extending parallel to the ground, means energizing said generators for emitting synchronous signals of ultrasonic energy, ultrasonic receivers on said aircraft positioned at laterally spaced points thereof and each adapted to receive pairs of synchronously emitted signals from said generators, and electric means connected to said receivers and responsive to the time lapse between reception by the respective receiver of a corresponding signal of a pair to develop a reversible electric signal corresponding to said time lapse whereby said signal is a measure of the bank angle of the aircraft.

7. In a system for the guidance of an aircraft, in combination, an elongated linear ultrasonic generator of cylindrical waves extending along the ground, means energizing said generator for emitting signals of ultrasonic energy, ultrasonic receivers on said aircraft positioned at transversely spaced points thereof for receiving said signals, and electric means connected to said receivers and responsive to the time lapse between reception of a common signal by the respective receivers to develop a reversible electric signal corresponding in sense and magnitude to said time lapse whereby said signal is a measure of the bank angle of the aircraft.

8. In a system for the guidance of an aircraft, in combination, at least one elongated ultrasonic generator extending parallel to the ground and adapted to generate cylindrical waves of ultrasonic energy, means exciting said generator with synchronous pulses at a predetermined carrier frequency, at least a pair of ultrasonic receivers on said aircraft at spaced points thereof adapted to receive ultrasonic energy at said frequency, and electric means connected to said receivers responsive to the time lapse between reception of a common pulse by said receivers for developing an electric signal corresponding to said time lapse.

9. In an altimetric system for the guidance of an aircraft, in combination, an elongated linear ultrasonic transmitter of cylindrical waves extending parallel to the ground, means exciting said transmitter for emitting pulsed signals of ultrasonic energy, a radio transmitter on the ground operable for emitting pulsed signals of radio energy synchronous with said ultrasonic signals, an ultrasonic receiver and a radio receiver on said aircraft for respectively receiving said ultrasonic and radio signals, and electric means connected to said receivers and responsive to the time lapse between reception by the respective receivers of synchronously emitted signals from the respective transmitters to develop an electric signal corresponding to said time lapse whereby said electric signal is a measure of the altitude of the aircraft.

10. In an altimetric system for the guidance of an aircraft flying along a predetermined flight path, in combination, an elongated linear ultrasonic generator of cylindrical waves extending over a substantial distance parallel to said flight path, means exciting said generator for emitting pulsed ultrasonic signals, a radio transmitter operable for emitting pulsed radio signals synchronous with said pulsed ultrasonic signals, an ultrasonic receiver and a radio receiver on said aircraft for respectively receiving said ultrasonic and radio signals, and means responsive to the time lapse between reception of synchronously emitted ultrasonic and radio signals for developing an altitude signal.

11. In a guidance system for an aircraft about to land along a predetermined glide path, in combination, an elongated linear ultrasonic generator of cylindrical waves extending over a substantial distance on the ground in a direction generally parallel to the projection of said glide path on a horizontal plane, means exciting said generator for emitting ultrasonic wave energy, at a predetermined constant frequency, receiver means on said aircraft for receiving said energy, and electric means connected to said receiver means and responsive to a frequency shift of the received frequency from said predetermined frequency to develop a corresponding signal whereby said signal is a measure of the rate of descent of the aircraft.

12. A linear electro-acoustic transducer comprising an elongated channel member of electrically conductive material provided with flanges, an elongated strip of insulating material having longitudinal edges bonded to said flanges for vibration with respect thereto at a predetermined natural frequency, conductive means applied to said strip over a longitudinally extending portion thereof, and circuit means connected to said channel member and to said conductive means, said circuit means including a source of alternating electric energy having an operating frequency corresponding to said natural frequency.

13. A linear electro-acoustic transducer comprising an elongated channel member of magnetic material provided with flanges, a strip of magnetostrictive material having longitudinal edges bonded to said flanges for vibration with respect thereto at a natural vibration frequency, electric conductor means extending within said channel member longitudinally thereof, and an alternating-voltage source having a frequency corresponding to said natural vibration frequency, said source being connected to said conductor means for energizing said member.

14. A linear electro-acoustic transducer comprising an elongated channel member of magnetic material provided with flanges, a magnetizable vibratory strip element having longitudinal edges bonded to said flanges, electromagnetic means extending in said member longitudinally thereof, and an alternating-current source having an operating frequency corresponding to the natural vibration frequency of said element, said source being connected to said electromagnetic means to vibrate the element.

15. A linear electro-acoustic transducer comprising an elongated rail-like element, a plurality of core members of magnetostrictive material having their one ends bonded to spaced points of said element for supporting the element along the length thereof in a manner enabling vibration of the element at a natural vibration frequency, winding means operatively coupled with said core members, and a source of alternating voltage having a frequency corresponding to said natural vibration frequency, said source being connected to said winding means for vibrating the element.

References Cited in the file of this patent

UNITED STATES PATENTS

| 684,706 | Mundy | Oct. 15, 1901 |
| 1,961,767 | Key | June 5, 1934 |
| 2,326,880 | Norman | Aug. 17, 1943 |
| 2,515,472 | Rich | July 18, 1950 |
| 2,617,874 | Lewis | Nov. 11, 1952 |
| 2,837,731 | Harris | June 3, 1958 |

FOREIGN PATENTS

| 219,726 | Great Britain | Aug. 14, 1924 |